United States Patent
Endo

(10) Patent No.: US 8,177,899 B2
(45) Date of Patent: May 15, 2012

(54) NON-AQUEOUS PIGMENT INK

(75) Inventor: Toshihiro Endo, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 12/659,519

(22) Filed: Mar. 11, 2010

(65) Prior Publication Data

US 2010/0242795 A1  Sep. 30, 2010

(30) Foreign Application Priority Data

Mar. 25, 2009  (JP) ................................ P2009-073343

(51) Int. Cl.
*C09D 11/02* (2006.01)

(52) U.S. Cl. .................................... 106/31.6; 106/31.86

(58) Field of Classification Search ................. 106/31.6, 106/31.86
See application file for complete search history.

(56) References Cited

U.S. PATENT DOCUMENTS

| 7,022,172 B2 * | 4/2006 | Ohkawa et al. ............ 106/31.86 |
| 2007/0022904 A1 * | 2/2007 | Kitawaki et al. ............ 106/31.86 |
| 2007/0101901 A1 * | 5/2007 | Endo et al. ................. 106/31.86 |

FOREIGN PATENT DOCUMENTS

JP 2007-126564 A  5/2007

\* cited by examiner

*Primary Examiner* — J. A. Lorengo
*Assistant Examiner* — Veronica F Faison
(74) *Attorney, Agent, or Firm* — The Nath Law Group; Joshua B. Goldberg

(57) ABSTRACT

A non-aqueous pigment ink comprising a pigment, a pigment dispersant and a non-aqueous solvent, wherein the non-aqueous solvent comprises an alcohol solvent, a fatty acid ester solvent and a hydrocarbon solvent, the alcohol solvent comprises a saturated branched alcohol containing 14 to 18 carbon atoms and having one branch, and an amount of the saturated branched alcohol is within a range from 3 to 40% by mass relative to a total mass of the ink.

5 Claims, No Drawings

NON-AQUEOUS PIGMENT INK

CROSS REFERENCE TO RELATED APPLICATIONS

This Application is based upon and claims the benefit of priority from prior Japanese Patent Application No. 2009-073343 filed on Mar. 25, 2009; the entire contents of which are incorporated by reference herein.

BACKGROUND OF THE INVENTION

1. Field of the Invention

The present invention relates to a non-aqueous pigment ink.

2. Description of the Related Art

An inkjet recording system is a printing system in which printing is conducted by spraying a liquid ink with a high degree of fluidity from very fine nozzles, and adhering that ink to a recording medium such as a sheet of paper. These systems enable the printing of high-resolution, high-quality images at high speed and with minimal noise, using a comparatively inexpensive printing apparatus, and are rapidly becoming widespread.

The coloring materials for the inks used in these inkjet recording systems can be broadly classified into materials that use pigments and materials that use dyes. Of these, there is a growing tendency for the use of inks that use pigments as the coloring materials, as such inks exhibit the excellent levels of light resistance, weather resistance and water resistance that are required for high image quality printing.

In terms of the solvent, inks can be broadly classified into aqueous inks and non-aqueous inks. Non-aqueous inks that do not use water as the ink solvent, including solvent-based inks that use a volatile solvent as the main constituent and oil-based inks that use a non-volatile solvent as the main constituent, exhibit superior stability within the printer (such as intermittent dischargeability and discharge recovery following standing idle for a long period), cause no curling of the printed paper and have a short ink penetration and drying time, and are therefore attracting considerable attention.

The nozzle plate surface of the inkjet head is subjected to an ink repellent treatment using a fluorine-based process or the like. The cleaning of this type of nozzle plate surface is performed by discharging a small amount of ink, suctioning the ink off with a suction device, and wiping the plate surface with a wiper blade. Abrasion of the nozzle blade surface by the wiper blade can cause a deterioration in the ink repellency of the nozzle plate surface.

If the ink repellency of the nozzle plate surface deteriorates, then the wettability of the plate surface by non-aqueous inks increases, which causes ink to adhere to the nozzle plate surface, and can cause discharge defects. Accordingly, it is important that a non-aqueous ink is provided that improves the ink repellency at the nozzle plate surface.

Increasing the polarity of the ink solvent and lowering the viscosity of the ink are effective in improving the ink repellency of the ink at the nozzle plate surface. However, polar solvents that have a low viscosity generally have a high degree of volatility, which means the stability of the ink within an inkjet printer may not be able to be favorably maintained.

Patent Document 1 (Japanese Patent Laid-Open No. 2007-126564) discloses an ink comprising an ester solvent, an alcohol solvent and a hydrocarbon solvent as the ink solvents, wherein the toner solubility properties are improved by specifying the polarity of the ester solvent. Although this ink exhibits its excellent stability within the printer and excellent toner solubility properties, when the nozzle plate surface of the inkjet head deteriorates as a result of usage over a long period, the ink repellency deteriorates, meaning the ink discharge performance and the image quality may deteriorate.

SUMMARY OF THE INVENTION

The present invention has an object of providing a non-aqueous pigment ink that exhibits excellent ink repellency at the nozzle plate surface of the inkjet head, and also exhibits excellent ink stability within the printer and superior dischargeability.

A first aspect of the present invention provides a non-aqueous pigment ink comprising a pigment, a pigment dispersant and a non-aqueous solvent, wherein the non-aqueous solvent comprises an alcohol solvent, a fatty acid ester solvent and a hydrocarbon solvent, the alcohol solvent comprises a saturated branched alcohol containing 14 to 18 carbon atoms and having one branch, and the amount of the saturated branched alcohol is within a range from 3 to 40% by mass relative to the total mass of the ink.

DETAILED DESCRIPTION OF THE EMBODIMENTS

A description of embodiments according to the present invention is presented below, but the examples within these embodiments in no way limit the scope of the present invention.

The non-aqueous pigment ink according to the present invention (hereafter also referred to as simply "the ink") comprises a pigment, a pigment dispersant and a non-aqueous solvent, wherein the non-aqueous solvent comprises an alcohol solvent, a fatty acid ester solvent and a hydrocarbon solvent, the alcohol solvent comprises a saturated branched alcohol containing 14 to 18 carbon atoms and having one branch, and the amount of the saturated branched alcohol is within a range from 3 to 40% by mass relative to the total mass of the ink.

According to the present invention, a non-aqueous pigment ink can be provided that exhibits excellent ink repellency at the nozzle plate surface of the inkjet head, excellent ink stability within the printer, and superior dischargeability.

The non-aqueous solvent comprises an alcohol solvent, a fatty acid ester solvent and a hydrocarbon solvent. In this description, the term "non-aqueous solvent" refers to non-polar organic solvents and polar organic solvents for which the 50% distillation point is at least 150° C. The "50% distillation point" is measured in accordance with JIS K0066 "Test Methods for Distillation of Chemical Products" and refers to the temperature at which 50% of the weight of the solvent has volatilized.

The alcohol solvent comprises a saturated branched alcohol that contains 14 to 18 carbon atoms and has one branch.

These types of saturated branched alcohols have a high polarity and low volatility, and can therefore be used to provide an ink that exhibits superior ink repellency at the nozzle plate surface and excellent stability within the printer. The number of carbon atoms within the saturated branched alcohol is within a range from 14 to 18, but a lower number is preferred from the viewpoint of the ink viscosity. However, if the number of carbon atoms is less than 14, then problems tend to arise, including an increase in the volatility of the ink that causes a deterioration in the stability within the printer, and a greater likelihood of odor. Accordingly, the number of carbon atoms within the saturated branched alcohol is set within a range from 14 to 18. Moreover, by specifying the number of branches as one, the viscosity of the non-aqueous solvent can be kept at a low level, meaning the ink dischargeability is excellent. If the number of branches is 2 or greater, then the viscosity of the non-aqueous solvent tends to increase, meaning it becomes difficult to maintain favorable dischargeability. Further, alcohols in which the number of branches is 0, namely straight-chain alcohols, are solid and difficult to handle.

Further investigation in terms of the ink stability within the printer reveals that if the number of carbon atoms within the saturated branched alcohol is large and the number of branches is large, then the viscosity of the alcohol itself increases, and if components within the ink volatilize, then the high-viscosity alcohol solvent remains, resulting in an increase in the ink viscosity and a deterioration in the stability within the printer. Further, if the number of carbon atoms within the saturated branched alcohol is small but the number of branches is large, then the alcohol itself volatilizes more readily, meaning that if components within the ink volatilize, then the alcohol also volatilizes, and the volume of residual solvent decreases, resulting in an increase in the ink viscosity and a deterioration in the stability within the printer. These findings also support a number of carbon atoms within the saturated branched alcohol of 14 to 18, and a number of branches of one.

In this description, the number of branches describes the number of branch chains that branch off the main chain, and if a branch chain is further branched, also includes those additional branches. For example, if a single branch chain branches off the main chain, and this branch chain includes an additional branch chain, then the number of branches is 2. In other words, a structure having one branch describes only those structures having a single branch chain off the main chain, and does not include structures that contain any additional branching.

The ratio within the saturated branched alcohol between the number of carbon atoms within the main chain and the number of carbon atoms within the branch chain is preferably within a range from 2:1 to 3:2, and is more preferably from 9:5 to 11:7.

The saturated branched alcohol is preferably a primary alcohol, and preferably has the hydroxyl group bonded to the carbon at position 1, and the branch chain bonded to a carbon at position 2 or greater.

Examples of the saturated branched alcohol include those compounds among isopalmityl alcohols, isostearyl alcohols and isomyristyl alcohols that contain 14 to 18 carbon atoms and have one branch. Specific examples of compounds that can be used favorably include isopalmityl alcohols that contain 16 carbon atoms and have one branch, isostearyl alcohols that contain 18 carbon atoms and have one branch, and isomyristyl alcohols that contain 14 carbon atoms and have one branch. Any of these compounds may be used individually, or two or more different compounds may be used in combination.

More specifically, the product "Fine Oxocol 1600" manufactured by Nissan Chemical Industries, Ltd. can be used. This product is an isopalmityl alcohol containing 16 carbon atoms and having one branch, wherein the number of carbon atoms in the main chain is 10, the number of carbon atoms in the branch chain is 6, the hydroxyl group is bonded to the position 1 carbon atom of the main chain, and the branch chain is bonded to the position 2 carbon atom of the main chain.

Further, the product "Risonol 18SP" manufactured by Kokyu Alcohol Kogyo Co., Ltd. may also be used. This product is an isostearyl alcohol containing 18 carbon atoms and having one branch, wherein the number of carbon atoms in the main chain is 11, the number of carbon atoms in the branch chain is 7, the hydroxyl group is bonded to the position 1 carbon atom of the main chain, and the branch chain is bonded to the position 2 carbon atom of the main chain.

The amount of the saturated branched alcohol, relative to the total mass of the ink, is preferably within a range from 3 to 40% by mass, and is more preferably from 10 to 40% by mass. By ensuring that the amount of the saturated branched alcohol is at least 3% by mass, the polarity of the non-aqueous solvent can be increased and the volatility decreased, thereby ensuring superior ink repellency properties and stability within the printer. If the amount of the saturated branched alcohol is less than 3% by mass, then the polarity of the non-aqueous solvent decreases, and satisfactory ink repellency properties may be unobtainable. Provided the amount of the saturated branched alcohol is not more than 40% by mass, the viscosity of the non-aqueous solvent can be kept low, resulting in superior discharge properties.

The non-aqueous solvent may also include other alcohol solvents besides the saturated branched alcohol described above, provided the effects of the present invention are not impaired. Examples of these other alcohol solvents include linear alcohols and branched alcohols such as isopalmityl alcohols, isostearyl alcohols, isomyristyl alcohols, hexyldecanols, octyldodecanols and decyltetradecanols having two or more branches.

For reasons of viscosity regulation, the non-aqueous solvent is preferably a mixed solvent containing a fatty acid ester solvent and a hydrocarbon solvent described below combined with the saturated branched alcohol described above. This type of non-aqueous solvent provides increased polarity and reduced volatility, and can also be used to regulate the viscosity, meaning an ink can be provided that exhibits excellent ink repellency at the nozzle plate surface, excellent stability within the printer, and superior dischargeability.

Although there are no particular restrictions on the fatty acid ester solvent, ester solvents composed of esters of a higher fatty acid of 8 to 20 carbon atoms and an alcohol of 1 to 24 carbon atoms are preferred.

The number of carbon atoms within the fatty acid ester is preferably within a range from 16 to 26, and is more preferably from 18 to 24. Ensuring that the number of carbon atoms is within this range enables a combination of more favorable discharge stability and more favorable stability within the printer to be achieved.

Specific examples of the fatty acid ester include isooctyl palmitate, isooctyl stearate, methyl laurate, isopropyl laurate, isopropyl myristate, isopropyl palmitate, isostearyl palmitate, methyl oleate, ethyl oleate, isopropyl oleate, butyl oleate, methyl linoleate, isobutyl linoleate, ethyl linoleate, isopropyl isostearate, methyl soybean oil, isobutyl soybean oil, methyl tallate, isobutyl tallate, diisopropyl adipate, diisopropyl sebacate, diethyl sebacate, propylene glycol monocaprate, trimethylolpropane tri-2-ethylhexanoate and glyceryl tri-2-ethylhexanoate. These compounds may be used individually, or in combinations containing two or more compounds.

Of the above fatty acid esters, the use of isooctyl palmitate and/or isooctyl stearate is preferred.

The amount of the fatty acid ester solvent, relative to the total mass of the ink, is preferably within a range from 10 to 80% by mass, and is more preferably from 15 to 50% by mass. If the amount of the fatty acid ester solvent exceeds 80% by mass, then achieving an ink viscosity capable of maintaining favorable dischargeability may become problematic, whereas if the amount of the fatty acid ester solvent is less than 10% by mass, then the change in the ink viscosity when the ink is left to stand within an open system tends to increase, making it difficult to maintain favorable stability within the printer.

Preferred examples of the hydrocarbon solvent include aliphatic hydrocarbon solvents, alicyclic hydrocarbon solvents and aromatic hydrocarbon solvents. Specific examples of preferred aliphatic hydrocarbon solvents and alicyclic hydrocarbon solvents include Teclean N-16, Teclean N-20, Teclean N-22, Nisseki Naphtesol L, Nisseki Naphtesol M, Nisseki Naphtesol H, No. 0 Solvent L, No. 0 Solvent M, No. 0 Solvent H, Nisseki Isosol 300, Nisseki Isosol 400, AF-4, AF-5, AF-6 and AF-7, manufactured by Nippon Oil Corporation; and Isopar Isopar H, Isopar L, Isopar M, Exxsol D40, Exxsol D80, Exxsol D100, Exxsol D130 and Exxsol D140, manufactured by Exxon Mobil Corporation. Specific examples of preferred aromatic hydrocarbon solvents include Nisseki Cleansol G (alkylbenzene) manufactured by Nippon Oil Corporation, and Solvesso 200 manufactured by Exxon Mobil Corporation. These solvents may be used individually, or in combinations containing two or more solvents.

The amount of the hydrocarbon solvent, relative to the total mass of the ink, is preferably within a range from 10 to 80% by mass, and is more preferably from 15 to 50% by mass. If the amount of the hydrocarbon solvent exceeds 80% by mass, then the change in the ink viscosity when the ink is left to stand within an open system tends to increase, making it difficult to maintain favorable stability within the printer, whereas if the amount of the hydrocarbon solvent is less than 10% by mass, then achieving an ink viscosity capable of maintaining favorable dischargeability may become problematic.

Besides the components described above, the non-aqueous solvent may also include a higher fatty acid-based solvent and/or an ether-based solvent, provided the effects of the present invention are not impaired. Specific examples of these other solvents include higher fatty acid-based solvents such as nonanoic acid, isononanoic acid, isomyristic acid, hexadecanoic acid, isopalmitic acid, oleic acid and isostearic acid; and ether-based solvents such as diethylene glycol monobutyl ether, ethylene glycol monobutyl ether, propylene glycol monobutyl ether and propylene glycol dibutyl ether.

Examples of the pigment include organic pigments such as azo-based pigments, phthalocyanine-based pigments, dye-based pigments, condensed polycyclic pigments, nitro-based pigments and nitroso-based pigments (such as brilliant carmine 6B, lake red C, Watchung red, disazo yellow, Hansa yellow, phthalocyanine blue, phthalocyanine green, alkali blue, and aniline black); inorganic pigments, including metals such as cobalt, iron, chrome, copper, zinc, lead, titanium, vanadium, manganese and nickel, as well as metal oxides and sulfides, and yellow ocher, ultramarine and iron blue pigments; and carbon blacks such as furnace carbon black, lamp black, acetylene black and channel black. Any one of these pigments may be used individually, or two or more different pigments may be used in combination.

From the viewpoints of dispersibility and storage stability, the average particle size of the pigment is preferably not more than 300 nm, and is more preferably 150 nm or less. In this description, the average particle size of the pigment refers to the value measured using a dynamic light-scattering particle size distribution measurement apparatus LB-500 manufactured by Horiba, Ltd.

The amount of the pigment within the ink is typically within a range from 0.01 to 20% by mass, and from the viewpoints of the print density and the ink viscosity, is preferably within a range from 3 to 15% by mass.

There are no particular restrictions on the pigment dispersant, provided it is capable of stably dispersing the pigment within the solvent. Examples of preferred pigment dispersants include hydroxyl group-containing carboxylate esters, salts of long-chain polyaminoamides and high molecular weight acid esters, salts of high molecular weight polycarboxylic acids, salts of long-chain polyaminoamides and polar acid esters, high molecular weight unsaturated acid esters, high molecular weight copolymers, modified polyurethanes, modified polyacrylates, polyetherester-type anionic activators, naphthalenesulfonic acid formalin condensate salts, polyoxyethylene alkyl phosphate esters, polyoxyethylene nonylphenyl ethers, polyester polyamines and stearylamine acetate, and of these, the use of a polymer dispersant is particularly desirable.

Specific examples of the pigment dispersant include products manufactured by The Lubrizol Corporation such as Solsperse 5000 (a phthalocyanine ammonium salt compound), 13940 (a polyesteramine compound), 17000 and 18000 (fatty acid amine compounds), and 11200, 22000, 24000 and 28000, products manufactured by Efka Chemicals such as Efka 400, 401, 402, 403, 450, 451 and 453 (modified polyacrylates), and 46, 47, 48, 49, 4010 and 4055 (modified polyurethanes), products manufactured by Kao Corporation such as Demol P and EP, Poiz 520, 521 and 530, and Homogenol L-18 (polycarboxylic acid type polymer surfactants), products manufactured by Kusumoto Chemicals Ltd. such as Disparlon KS-860 and KS-873N4 (high molecular weight polyesteramine salts), and products manufactured by Dai-ichi Kogyo Seiyaku Co., Ltd. such as Discol 202, 206, OA-202 and OA-600 (multi-chain polymeric nonionic compounds).

The amount of the pigment dispersant, reported as a mass ratio relative to a value of 1 for the pigment, is preferably within a range from 0.2 to 1.0. The amount of the pigment dispersant relative to the total mass of the ink is preferably within a range from 1 to 15% by mass.

The ink of the present invention may also include, as required, any of the various additives typically used within this technical field, such as dyes, surfactants and preservatives and the like, provided the inclusion of these additives does not impair the object of the present invention.

The ink of the present invention can be prepared by mixing the various components using an appropriate dispersion device such as a ball mill or a beads mill, and there are no particular restrictions on the preparation method used. For example, the ink can be produced by first preparing a pigment dispersion comprising the pigment, the pigment dispersant and the non-aqueous solvent, and then adding additional non-aqueous solvent and any other optional components. The non-aqueous solvent (or diluting solvent) used during preparation of the pigment dispersion is preferably the same as the non-aqueous solvent incorporated within the ink, and in those cases where the pigment dispersant is synthesized by solution polymerization, is preferably the same as the polymerization solvent.

The ink according to the present invention can be used favorably within an inkjet recording apparatus. When used as an inkjet ink, the ideal range for the viscosity of the ink varies depending on factors such as the diameter of the discharge head nozzles and the discharge environment, but at 23° C. is preferably within a range from 5 to 30 mPa·s, is more preferably from 5 to 15 mPa·s, and is most preferably approximately 10 mPa·s. Here, the viscosity is measured at 23° C. by raising the shear stress from 0 Pa at a rate of 0.1 Pa/s, and refers to the measured value at 10 Pa.

The inkjet printer used when the ink of the present invention is employed within an inkjet recording system may employ any of various printing systems, including a piezo system or electrostatic system. In those cases where an inkjet recording apparatus is used, the ink of the present invention is discharged from the inkjet head based on a digital signal, and the discharged ink droplets are adhered to a recording medium.

EXAMPLES

A more detailed description of the present invention is provided below based on a series of examples, although the present invention is in no way limited by these examples.

Examples 1 to 5

Comparative Examples 1 to 7

The components listed in Table 1 were premixed in the proportions listed in Table 1, and the resulting mixture was then dispersed for approximately 10 minutes using a beads mill, thus preparing a series of inkjet inks. The blend amounts for the components within Table 1 represent mass % values.

The components listed in Table 1 are as follows. Further, the number of carbon atoms and the number of branches within the alcohol solvent are detailed in Table 2.

MA8 (a product name): a carbon black, manufactured by Mitsubishi Chemical Corporation S5000: Solsperse 5000 (a product name), manufactured by The Lubrizol Corporation S28000: Solsperse 28000 (a product name), manufactured by The Lubrizol Corporation Isomyristyl alcohol: Fine Oxocol 140N (a product name), manufactured by Nissan Chemical Industries, Ltd.

Isopalmityl alcohol: Fine Oxocol 1600 (a product name), manufactured by Nissan Chemical Industries, Ltd.

Isostearyl alcohol (A): Risonol 18SP (a product name), manufactured by Kokyu Alcohol Kogyo Co., Ltd.

Isostearyl alcohol (B): Fine Oxocol 180N (a product name), manufactured by Nissan Chemical Industries, Ltd.

Isostearyl alcohol (C): Fine Oxocol 180 (a product name), manufactured by Nissan Chemical Industries, Ltd.

Isoeicosyl alcohol: Fine Oxocol 2000 (a product name), manufactured by Nissan Chemical Industries, Ltd.

Isooctyl palmitate: manufactured by Nikko Chemicals Co., Ltd.

Isooctyl stearate: manufactured by Nikko Chemicals Co., Ltd.

AF4 (a product name): a petroleum-based hydrocarbon solvent, manufactured by Nippon Oil Corporation Each of the inkjet inks obtained from the above examples and comparative examples was evaluated for ink viscosity, nozzle ink repellency, ink stability within the printer, and dischargeability using the methods described below. The results of these evaluations are detailed in Table 1.

<Ink Viscosity>

The viscosity represents the viscosity at 10 Pa when the shear stress was raised from 0 Pa at a rate of 0.1 Pa/s at a temperature of 23° C., and was measured using a controlled stress rheometer RS75 manufactured by Haake GmbH (cone angle: 1°, diameter: 60 mm).

<Nozzle Ink Repellency>

Following preparation of the above inks, each ink was loaded into an inkjet printer (Orphis HC5000 (a product name), manufactured by Riso Kagaku Corporation), the cleaning maintenance operation was performed 1,000 times, and the ink repellency of the nozzle plate surface was evaluated. The cleaning maintenance operation was performed by executing the "normal cleaning" operation that represents one of the cleaning modes provided within the Orphis HC5000. In this "normal cleaning" operation, the ink pathway was pressurized to expel any ink from the head nozzles, and a rubber wiper blade was wiped across the nozzle surface while a suction system was used to suck any residual ink off the nozzle plate. The ink repellency of the nozzle plate surface was evaluated against the criteria below by inspecting the nozzle surface visually to determine whether any ink remained on the nozzle plate.

A: ink repellency was retained even after 1,000 repetitions of the cleaning maintenance operation B: ink repellency disappeared after at least 500 repetitions, but before 1,000 repetitions of the cleaning maintenance operation C: ink repellency disappeared before 500 repetitions of the cleaning maintenance operation <Ink Stability within the Printer>

Following preparation of the above inks, each ink was loaded into an inkjet printer Orphis HC5000 (a product name, manufactured by Riso Kagaku Corporation), and was then left to stand for 3 months in an atmosphere at 35° C. During this time, the inkjet head nozzles were not sealed, and volatilization of the solvents within the ink was able to proceed. After the standing period, the "strong cleaning" operation that represents one of the head cleaning functions provided within the Orphis HC5000 was executed once at 20° C., and solid printing was then performed onto a paper (Riso paper IJ, manufactured by Riso Kagaku Corporation). If ink failed to be discharged from one or more of the head nozzles (resulting in the appearance of white bands within the printed image), then the "strong cleaning" operation was performed once more, and solid printing was then conducted again. The "strong cleaning" involves the same operations as the "normal cleaning" described above, with the exceptions that the pressure applied to the ink pathway is greater, and the pressurization time is longer. The ink stability within the printer was evaluated against the criteria below.

A: no discharge faults (no white bands within the image) occurred after the first strong cleaning operation B: no discharge faults occurred after the second strong cleaning operation C: discharge faults occurred even after the second strong cleaning operation <Dischargeability>

Following preparation, each of the above inks was loaded into an inkjet printer Orphis HC5000 (a product name, manufactured by Riso Kagaku Corporation), and solid printing was performed onto a paper (Riso paper II, manufactured by Riso Kagaku Corporation). The printed image was inspected visually, and evaluated against the criteria below.

A: a uniform solid image

C: density irregularities and/or a decrease in density occurred

TABLE 1

Ink formulations and evaluation results

| Mass % | | Example 1 | 2 | 3 | 4 | 5 | Comparative example 1 | 2 | 3 | 4 | 5 | 6 | 7 |
|---|---|---|---|---|---|---|---|---|---|---|---|---|---|
| Carbon black | MA8 | 5.0 | 5.0 | 5.0 | 5.0 | 5.0 | 5.0 | 5.0 | 5.0 | 5.0 | 5.0 | 5.0 | 5.0 |
| Dispersant | S5000 | 2.0 | 2.0 | 2.0 | 2.0 | 2.0 | 2.0 | 2.0 | 2.0 | 2.0 | 2.0 | 2.0 | 2.0 |
| | S28000 | 3.0 | 3.0 | 3.0 | 3.0 | 3.0 | 3.0 | 3.0 | 3.0 | 3.0 | 3.0 | 3.0 | 3.0 |
| Alcohol solvent | Isomyristyl alcohol | — | — | — | — | — | — | — | 25.0 | — | — | — | — |
| | Isopalmityl alcohol | 25.0 | — | 10.0 | 5.0 | 30.0 | — | — | — | — | 1.0 | 45.0 | 45.0 |
| | Isostearyl alcohol (A) | — | 25.0 | — | — | — | — | — | — | — | — | — | — |
| | Isostearyl alcohol (B) | — | — | — | — | — | — | 25.0 | — | — | — | — | — |
| | Isostearyl alcohol (C) | — | — | — | — | — | 25.0 | — | — | — | — | — | — |
| | Isoeicosyl alcohol | — | — | — | — | — | — | — | — | 25.0 | — | — | — |
| Fatty acid ester solvent | Isooctyl palmitate | — | — | 35.0 | 40.0 | 15.0 | — | — | — | — | 44.0 | — | 45.0 |
| | Isooctyl stearate | 20.0 | 20.0 | — | — | — | 20.0 | 20.0 | 20.0 | 20.0 | — | — | — |
| Hydrocarbon solvent | AF4 | 45.0 | 45.0 | 45.0 | 45.0 | 45.0 | 45.0 | 45.0 | 45.0 | 45.0 | 45.0 | 45.0 | — |
| Total | | 100.0 | 100.0 | 100.0 | 100.0 | 100.0 | 100.0 | 100.0 | 100.0 | 100.0 | 100.0 | 100.0 | 100.0 |
| Evaluations | Ink viscosity (mPa·s/23° C.) | 10.0 | 10.2 | 8.6 | 8.4 | 10.8 | 11.6 | 11.2 | 11.0 | 12.1 | 8.2 | 13.7 | 17.9 |
| | Nozzle ink repellency | A | A | A | B | A | A | A | A | A | C | A | A |
| | Stability within the printer | A | A | A | A | A | B | B | B | A | A | A | A |
| | Dischargeability | A | A | A | A | A | C | C | C | C | A | C | C |

TABLE 2

Number of carbon atoms and number of branches within alcohol solvents

| Alcohol solvent | Number of carbon atoms | Number of branches |
|---|---|---|
| Isomyristyl alcohol | 14 | 3 |
| Isopalmityl alcohol | 16 | 1 |
| Isostearyl alcohol (A) | 18 | 1 |
| Isostearyl alcohol (B) | 18 | 3 |
| Isostearyl alcohol (C) | 18 | 7 |
| Isoeicosyl alcohol | 20 | 1 |

As is evident from Table 1, examples 1 to 5 yielded favorable results, and it was found that the number of carbon atoms and number of branches within the alcohol solvent, and the combination of the alcohol solvent, the fatty acid ester solvent and the hydrocarbon solvent were all important factors.

In comparative examples 1 to 3, the number of branches within the alcohol solvent was 7, 3 and 3 respectively, and compared with the examples, the viscosity was high and the dischargeability was poor. In comparative example 4, the number of carbon atoms within the alcohol solvent was 20, and compared with the examples, the viscosity was high and the dischargeability was poor. In comparative example 5, the amount of the alcohol solvent was small, and therefore the effect on the ink repellency properties was inadequate. In comparative examples 6 and 7, the inks contained no ester solvent or hydrocarbon solvent, and in both cases, the viscosity was high and the dischargeability was poor.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A non-aqueous pigment ink comprising a pigment, a pigment dispersant and a non-aqueous solvent, wherein
the non-aqueous solvent comprises an alcohol solvent, a fatty acid ester solvent and a hydrocarbon solvent,
the alcohol solvent comprises a saturated branched alcohol containing 14 to 18 carbon atoms and having one branch,
an amount of the saturated branched alcohol is within a range from 30 to 40% by mass relative to a total mass of the ink, and
a viscosity of the ink at 23° C. is 5 to 10.8 mPa·s.

2. The non-aqueous pigment ink according to claim 1, wherein the fatty acid ester solvent comprises an ester of a higher fatty acid of 8 to 20 carbon atoms and an alcohol of 1 to 24 carbon atoms.

3. The non-aqueous pigment ink according to claim 2, wherein the fatty acid ester solvent comprises at least one of isooctyl palmitate and isooctyl stearate.

4. The non-aqueous pigment ink according to claim 1, wherein the saturated branched alcohol contains 14 to 16 carbon atoms.

5. The non-aqueous pigment ink according to claim 1, wherein 50% by mass or more a total mass of the non-aqueous solvent is a non-polar organic solvent.

* * * * *